United States Patent
Aoyama et al.

(10) Patent No.: US 6,674,210 B2
(45) Date of Patent: Jan. 6, 2004

(54) ROTARY ELECTRIC MACHINE

(75) Inventors: Hiroshi Aoyama, Tsuchiura (JP); Kazuo Gotou, Mito (JP); Hidehiro Ejima, Hitachi (JP); Takashi Shibata, Hitachi (JP)

(73) Assignee: Hitachi, Ltd., Tokyo (JP)

(*) Notice: Subject to any disclaimer, the term of this patent is extended or adjusted under 35 U.S.C. 154(b) by 2 days.

(21) Appl. No.: 10/139,243

(22) Filed: May 7, 2002

(65) Prior Publication Data
US 2003/0057795 A1 Mar. 27, 2003

(30) Foreign Application Priority Data
Sep. 21, 2001 (JP) .......................... 2001-287993

(51) Int. Cl.[7] ................................................ H02K 3/34
(52) U.S. Cl. ............................................... 310/214
(58) Field of Search ........................... 310/214, 215, 310/45

(56) References Cited

U.S. PATENT DOCUMENTS 3,679,926 A * 7/1972 Simmonds et al. ......... 310/214
6,316,859 B1 * 11/2001 Aoyama et al. ............ 310/214
6,426,578 B1 * 7/2002 Mori et al. ................. 310/214

FOREIGN PATENT DOCUMENTS

| JP | 358212338 A | * 5/1982 | ............ H02K/3/38 |
| JP | A-6-86492 | 3/1994 | |
| JP | A-7-163075 | 6/1995 | |
| JP | A-8-322180 | 12/1996 | |

* cited by examiner

Primary Examiner—Nestor Ramirez
Assistant Examiner—Nguyen Hanh
(74) Attorney, Agent, or Firm—Antonelli, Terry, Stout & Kraus, LLP

(57) ABSTRACT

When molding reinforced fiber layers of a creepage block which is in contact with a field winding in a rotor of a rotary electric machine, a layer containing organic fibers made from polybenzoimidazole, polyparaphenylenebenzobisoxazole, aromatic polyamide, polyarylate, and aromatic polyester is integrally molded on that side of the creepage block which is for contact with a field winding. The rotor thus formed stabilizes a slippage between the field winding and the creepage block caused by thermal expansion of the field winding in the rotor during the operation and thereby minimizes the amount of bending of a rotor shaft.

11 Claims, 10 Drawing Sheets

DIRECTION OF ROTOR AXIS

ROTARY ELECTRIC MACHINE

BACKGROUND OF THE INVENTION

The present invention relates to a rotary electric machine for mounting on a turbine generator and the like.

A rotary electric machine has a cylindrical rotor with slots formed in its circumference at equal intervals, as shown in FIG. 1 to FIG. 3 (details will be described later). Inserted in each of the slots are a field winding, a creepage block for insulating the field winding, and a wedge for preventing the field winding from coming off.

When, upon energization of the field winding, the rotor incorporating the creepage block rotates at high speed, the field winding is subjected to heat produced by electric current flowing therein and a high surface pressure from the creepage block and wedge produced by a large centrifugal force of rotation and is therefore thermally elongated.

At this time, the most radially outward turn of the field winding slips relative to the creepage block. If a friction coefficient between the creepage block and the field winding is larger than that between the creepage block and the wedge, a slippage occurs between the creepage block and the wedge.

Further, when the friction coefficient between the creepage block and the wedge is larger than that between a wedge side surface and a tooth side surface, the slippage shifts to between the wedge side surface and the tooth side surface.

When these friction coefficient values vary from one slot to another in the rotor, a bending force acting on the shaft of the rotor also varies, resulting in a bending of the rotor shaft.

This bending will ultimately lead to an abnormal shaft vibration of the rotary electric machine and thus must be minimized. Even if all the slots have identical friction coefficient variations but if the slipping portion varies among the contact between the field winding and the creepage block, the contact between the creepage block and the wedge, and the contact between the wedge and the rotor shaft, a moment arm on the rotor shaft will ultimately change, resulting in the shaft being bent.

Means for addressing the problem of the rotor shaft bending described above are disclosed in, for example, JP-6-86492A, JP-7-163075A and JP-8-322180A.

In the examples disclosed in JP-6-86492A, a sheet, which is made of graphite and covered with polytetrafluoroethylene, is interposed between the most radially external turn of the field winding and the next most external turn to improve the slippage between the adjoining turns of the field winding.

The example disclosed in JP-7-163075A comprises a field winding received in each coil slot, a wedge inserted into an opening of the slot to firmly hold the field winding in the slot, and a low-friction coefficient material, such as aramid paper, coated with polytetrafluoroethylene and interposed between the wedge and the field winding to improve the slippage of the field winding.

Further, in the example disclosed in JP-8-322180A, a low-friction coefficient material, such as polytetrafluoroethylene, is integrally formed between the wedge and the field winding in the rotary slot to improve the slippage of the filed winding.

The conventional techniques described above have the following problems.

All the prior arts of JP-6-86492A, JP-7-163075A and JP-8-322180A are the examples of attempting to reduce a frictional force acting on the field winding and therefore the shaft bending force by inserting a member coated with a friction coefficient reducing agent, such as polytetrafluoroethylene, into a contact portion that engages the field winding or by integrally molding such a member and the contact portion. The member used, however, has too low a friction coefficient of about 0.05, which in turn causes even greater variations in the frictional force. This is considered to occur due to the fact that the thickness of the coated friction coefficient reducing agent is not necessarily uniform.

Further, because the friction coefficient is small, the length that the field winding slips becomes large, increasing a range of frictional force variations.

As a result, when this member is incorporated into a rotor, the rotor shaft is bent to a significant extent, increasing the shaft oscillations. Further, in the example of the sliding sheet or friction-reducing member, because it has a very small thickness, when the field winding is repetitively subjected to thermal elongations and therefore frictions, the sheet is likely to be broken, and this becomes a problem in strength.

BRIEF SUMMARY OF THE INVENTION

An object of the present invention is to provide a rotary electric machine which minimizes frictional force variations caused by the field winding of the rotor being thermally expanded and thereby reduces the bending of the rotor shaft even when the thermal expansion of the field winding repetitively occurs.

The object stated above can be achieved by a rotary electric machine which comprises a stator frame, a rotor mounted on the stator frame through bearings, a plurality of slots formed in an outer circumferential surface of the rotor; a field winding installed in the slots, and creepage blocks for electric insulation supported in openings of the rotor in contact with the field winding, wherein each of the creepage blocks is formed by pressing together a resin member containing reinforcement fibers and organic fibers for contact with the field winding.

Further, the above objective can also be realized by a rotary electric machine which comprises a stator frame, a rotor mounted on the stator frame through bearings, a plurality of slots formed in an outer circumferential surface of the rotor, a field winding installed in the slots, and creepage blocks for electric insulation supported in openings of the rotor in contact with the field winding, wherein each of the creepage blocks comprises prepreg sheets and organic fibers for contact with the field winding, the prepreg sheets having reinforcement fibers aligned in a direction, impregnated with semi-hardened resin and fixed together, and the organic fibers for contact with the field winding are oriented to a direction of axis of the rotor.

Further, the above objective can also be realized by a rotary electric machine wherein each of the creepage blocks comprises prepreg sheets and organic fibers for contact with the field winding, the prepreg sheets having reinforcement fibers that are aligned in a direction, impregnated with semi-hardened resin and fixed together, and the organic fibers are short and directed in random directions.

Further, the above objective can also be achieved by a rotary electric machine wherein the organic fibers for contact with the field winding include fibers made from polybenzoimidazole, polyparaphenylene benzobisoxazole, aromatic polyamide, polyarylate, and aromatic polyester.

Further, the above objective can also be realized by a rotary electric machine wherein the organic fibers for contact with the field winding include fibers with a heat resistance of 300° C. or higher.

Further, the above objective can also be realized by a rotary electric machine wherein a surface of the organic fibers for contact with the field winding is combined with fibers made from polyethylene, polypropylene and nylon.

Further, the above objective can also be realized by a rotary electric machine wherein the surface of the organic fibers for contact with the field winding is machined so that the organic fibers are exposed at the surface.

Further, the above objective can also be realized by a rotary electric machine wherein the surface of the organic fibers for contact with the field winding has a thickness equal to or less than one fourth the thickness of the creepage block.

Further, the above objective can also be realized by a rotary electric machine wherein each of the creepage blocks is formed with holes extending in a direction of a thickness of the block and members containing organic fibers are inserted in the holes.

Other objects, features and advantages of the invention will become apparent from the following description of the embodiments of the invention taken in conjunction with the accompanying drawings.

DETAILED DESCRIPTION OF THE INVENTION

By the way, turbine generators and the like are generally placed in service for a long period of time as long as they do not fail. During the service, however, starting and stopping are repeated, and the resulting impacts are considered to act on the respective slots and produce imbalances in friction resistance among the slots.

In particular, the turbine generator is normally installed horizontally and thus its rotor shaft rotates in a horizontal direction. It is considered that, if the frictional resistance imbalances among the slots adversely affect the rotor shaft and bend it, the bending oscillates in a vertical direction, further amplifying the imbalances of frictional resistance.

An investigation into various possible causes of the frictional resistance imbalances has revealed that rubbing of the copper field winding and the creepage block produces copper particles from the field winding, which adhere unevenly between the creepage block and the field winding, resulting in the frictional resistance imbalances.

Then, this invention seeks to reduce wear of the field winding as much as possible to minimize the forming of copper particles.

The present invention will be described in detail based on embodiments shown in the accompanying drawings.

Figure 1:
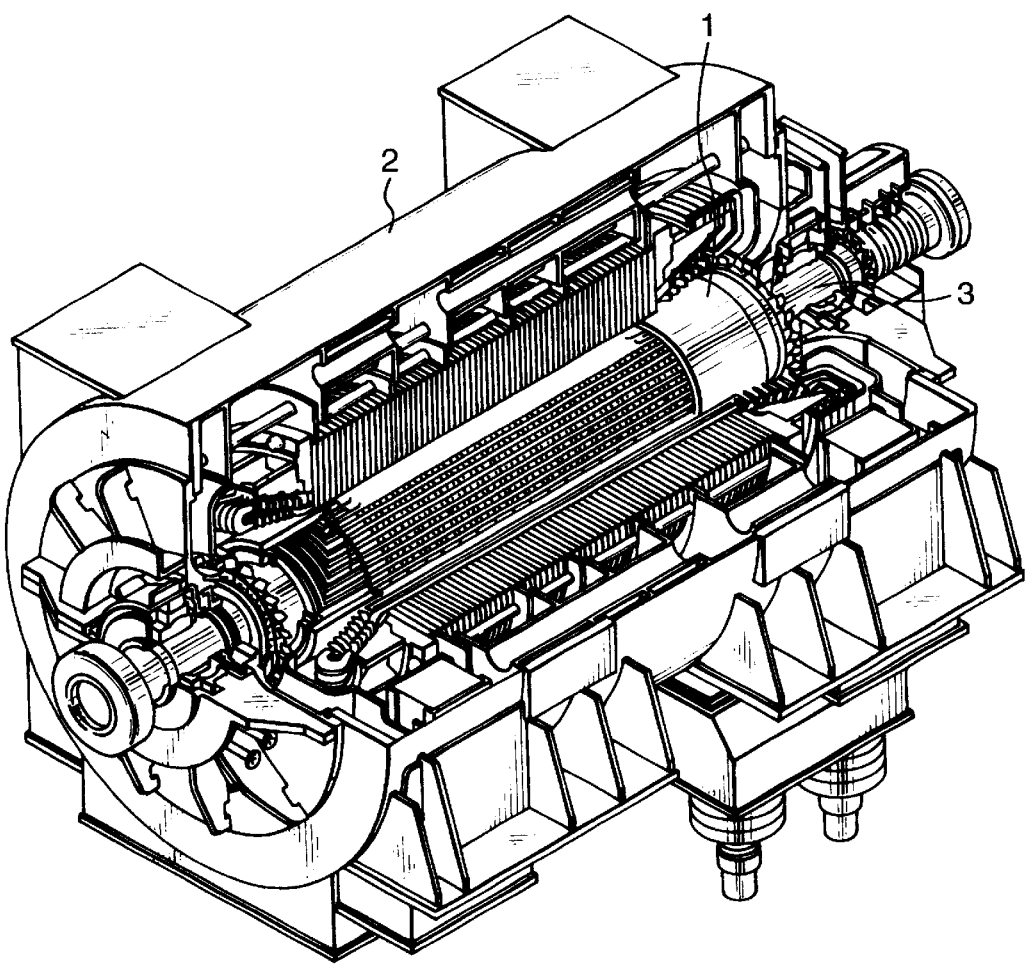
FIG. 1 is a perspective view of a rotary electric machine.

FIG. 1 is a perspective view of a rotary electric machine, which is partly cut away so that the interior thereof can be seen.

In FIG. 1, reference numeral 1 denotes a rotor of a cylindrical shape, through which a rotary shaft is inserted at an axial center thereof. Denoted by 2 is a stator frame for fixing the stator, which is formed to enclose the outer circumference of the rotor 1. Denoted 3 are bearings provided at two positions inside the stator frame 2 to rotatably support the rotor 1.

Figure 2:
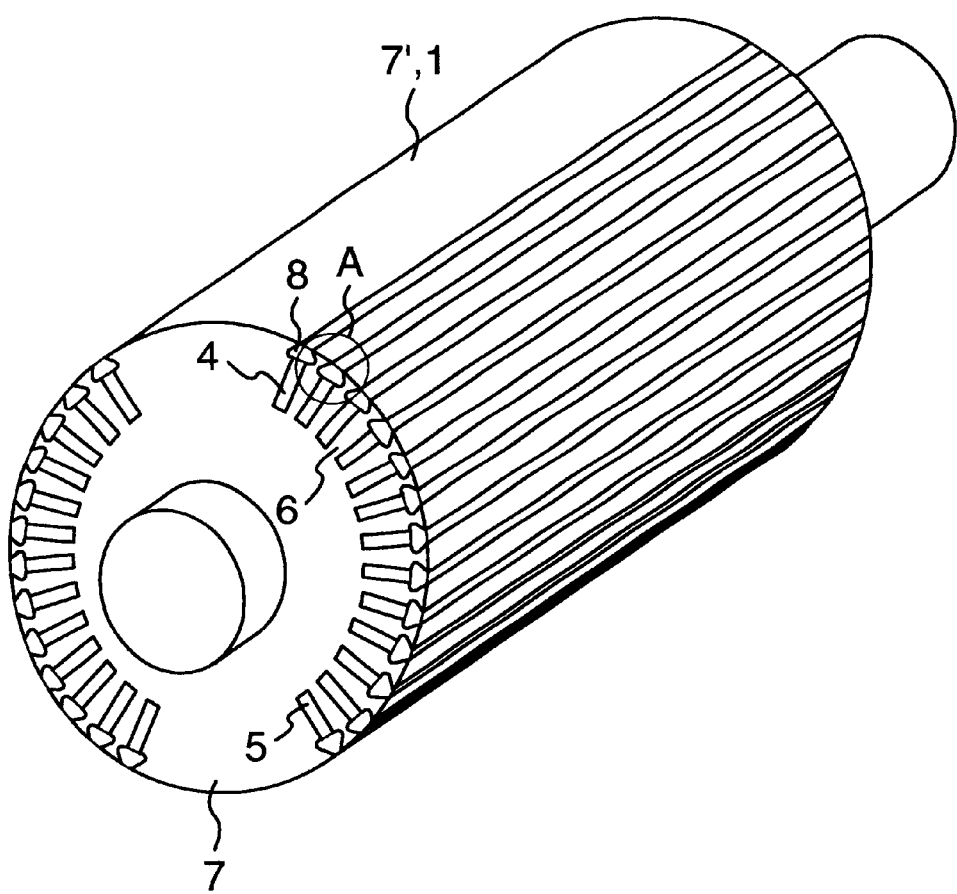
FIG. 2 is a perspective view of a rotor.

FIG. 2 is a perspective view of the rotor.

In FIG. 2, the rotor 1 is cylindrical in its axial direction. In its outer circumference the rotor 1 has axially extending slots 5 formed at equal intervals. In these slots 5 a field winding 4 is installed. Machining these slots 5 forms comb-shaped teeth 6 between the slots 5. The rotor 1 has magnetic pole portions 7, 7' with no slots 5 formed therein. Although in this embodiment two of such magnetic pole portions are provided, they may be formed at four locations.

In each of the slots 5, a wedge 8 is fitted between the teeth 6 of the rotor 1 to prevent the field winding 4 from coming off in the radial direction by a centrifugal force during rotation.

Figure 3:
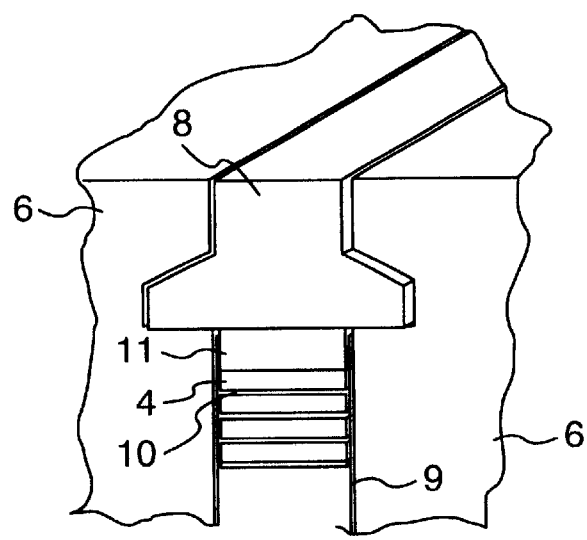
FIG. 3 is an enlarged perspective view of portion A in FIG. 2.

FIG. 3 is an enlarged view of portion A in FIG. 2.

In FIG. 3, a resin plate called slot armor 9 for electric insulation is attached to each inner side wall of the slots separated by the teeth 6. The field winding 4 has a rectangular cross section. A plurality of turns of the field winding 4 are stacked one upon the other. Between the adjoining turns an interlayer insulating material 10 is interposed. The outermost turn of the field winding 4 engages a creepage block 11 for electric insulation and is held against a centrifugal force during the rotation by the wedge 8 supported between the teeth 6.

Figure 4:
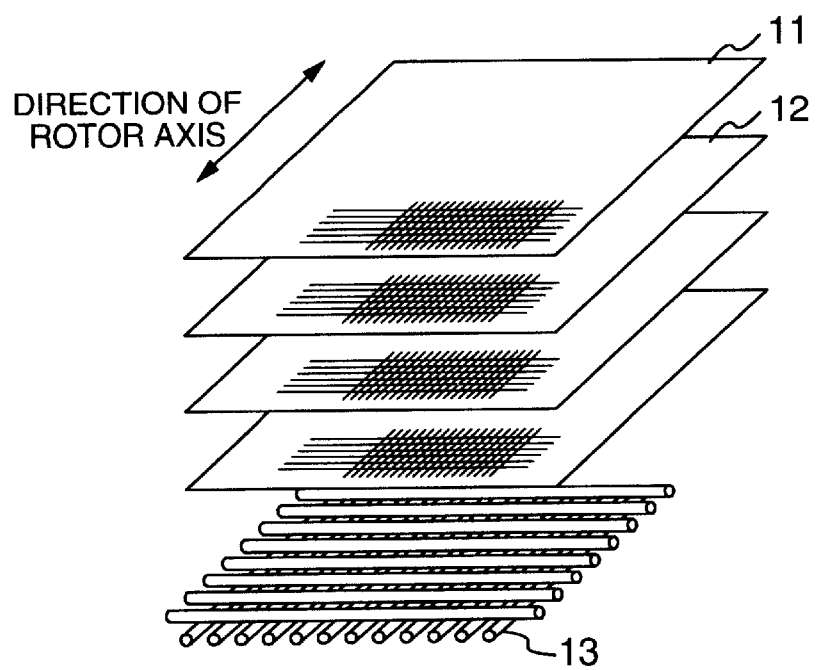
FIG. 4 is a perspective view showing reinforced fiber layers in a creepage block.

FIG. 4 is a perspective view of reinforced fiber layers that form the creepage block 11.

In FIG. 4, the creepage block 11 comprises a combination of a plurality of prepreg sheets 12 and organic fibers 13 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat. Those of the organic fibers 13 on the surface side extend in the same direction as the axis of the rotor 1. The glass fiber cloth is made by weaving fibers extending in a direction of the rotor axis and fibers extending in a direction perpendicular to the rotor axis.

The glass fibers and the organic fibers 13 are impregnated with the same epoxy resin and are integrally formed under pressure and heat as a base material of the creepage block 11. Among fibers that may be used as the organic fibers 13 are those made from polybenzoimidazole, polyparaphenylenebenzobisoxazole, aromatic polyamide, polyarylate, and aromatic polyester.

These fibers have a heat resistance of 300° C. or higher so that when the field winding 4 is energized and its temperature rise causes the field winding to expand in the direction of axis of the rotor 1, these fibers are not destroyed by the frictional heat and maintain a stable frictional state. Hence, they can prevent the field winding 4 from being galled and producing copper particles.

Figure 5:
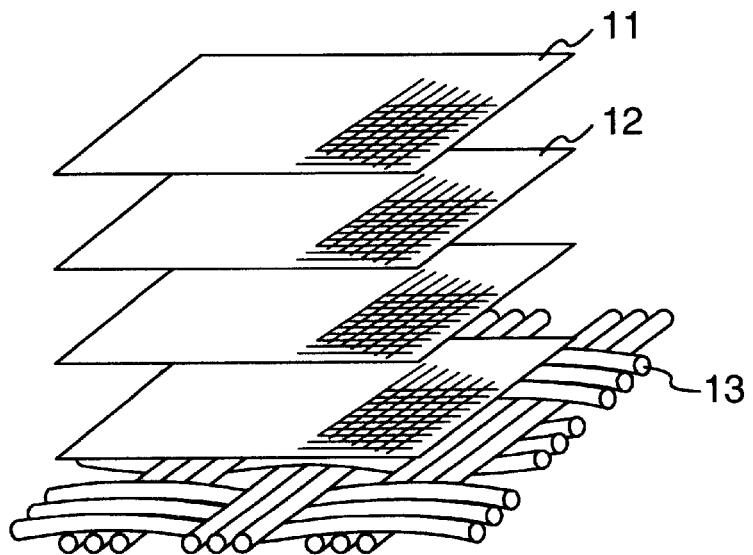
FIG. 5 is a perspective view showing reinforced fiber layers in a creepage block as another embodiment.

FIG. 5 is a perspective view showing reinforced fiber layers forming the creepage block as another embodiment of the invention.

In FIG. 5, the creepage block 11 is a combination of a laminated prepreg sheet 12 and organic fibers 13 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat. The fabric of organic fibers 13 is made by weaving bundles of several fibers. When the field winding 4 is energized and its temperature rise causes the field winding to expand in the direction of axis of the rotor 1, because the fabric of organic fibers 13 of the creepage block 11 is in contact with the field winding 4, slippage between the field winding 4 and the creepage block 11 becomes smooth to stabilize the friction coefficient, allowing the field winding 4 to slide smoothly along the surface of the creepage block 11 even under high surface pressure.

Hence, variations in the friction coefficient among the coil slots also decrease, resulting in a reduced friction. Therefore, even when the field winding is repetitively elongated due to heat, the amount of copper particles produced from the field winding due to rubbing can be reduced.

Figure 6:
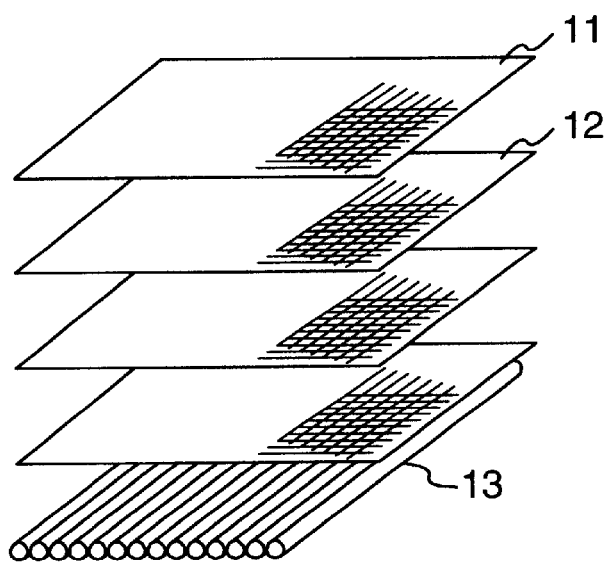
FIG. 6 is a perspective view showing reinforced fiber layers in a creepage block as still another embodiment.

FIG. 6 is a perspective view showing reinforced fiber layers forming the creepage block as still another embodiment.

In FIG. 6, the creepage block 11 comprises a combination of a plurality of prepreg sheets 12 and organic fibers 13 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat.

The organic fibers 13 form a face contacting with the field winding 4 and extend in the same direction with that of the rotor axis. If this construction comprises only the fibers 13 extending in the rotor axis, there is a fear that the organic fibers will be split in the fiber direction. However, since they are combined with the prepreg sheets 12 comprising the glass fibers extending in the axis direction and those extending in a direction perpendicular to the rotor axis, the organic fibers 13 are provided with a sufficient strength and can prevent the splitting.

Thus, when the field winding 4 is energized and expands in the rotor axis direction by heat, since the organic fibers of the creepage block 11 extend in the same direction as the rotor axis, the field winding 4 can be slid smoothly, reducing the friction coefficient and minimizing the forming of copper particles from the field winding 4.

Figure 7:
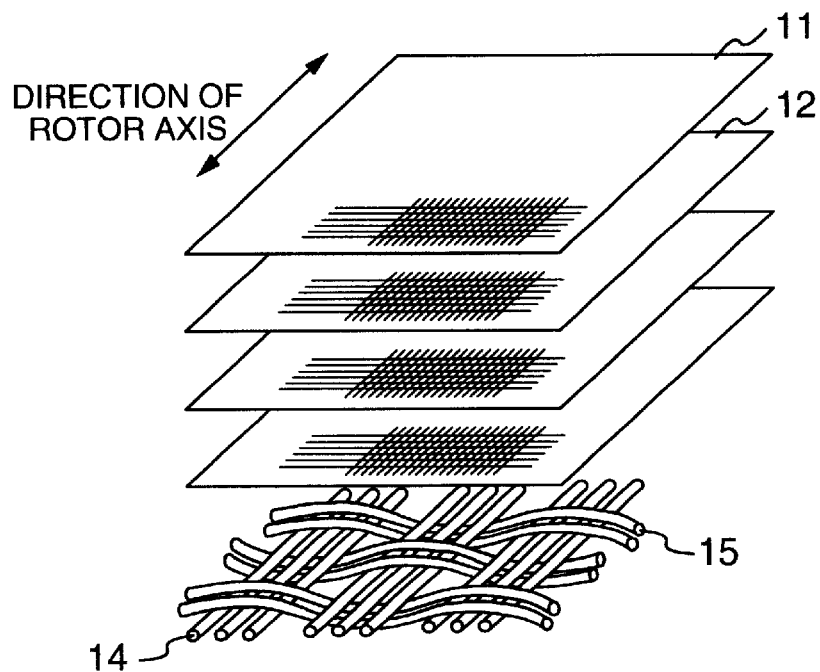
FIG. 7 is a perspective view showing reinforced fiber layers in a creepage block as a further embodiment.

FIG. 7 is a perspective view showing reinforced fiber layers forming the creepage block as a further embodiment of the invention.

In FIG. 7, the creepage block 11 comprises a combination of a plurality of prepreg sheets 12 and organic fibers 14, 15 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat. The organic fibers are woven in such a way that the number of organic fibers 14 arranged on a side for contact with the field winding 4 is larger than the number of organic fibers 15 extending in a direction perpendicular to that of the rotor axis. The organic fibers 14 to be provided in a greater number may be in only one layer which is for contact with the field winding 4. Alternatively, they may be arranged in a plurality of layers including that layer for contact with the field winding 4.

The fibers may be woven in a plain weave or a satin weave.

According to this embodiment, woven on that side of the creepage block 11 which is in contact with the field winding 4 are reinforcement fibers (glass fibers) harder than the field winding 4. Further, the number of the organic fibers continuously arranged in the direction in which the field winding expands by heat is larger than the number of the glass fibers arranged in the direction perpendicular to that of the thermal expansion. Thanks to this construction, when the field winding 4 is energized, has a temperature rise and is expanding in the direction of the axis of the rotor 1, the field winding 4 can slide smoothly along the surface of the creepage block 11 in the rotor axis direction even under high surface pressure. Moreover, since the glass fibers extending in the perpendicular direction to the rotor axis restrain the organic fibers in the rotor axis direction so that the organic fibers will not separate from each other, it is possible to provide the creepage block that is highly reliable also in terms of strength.

Figure 8:
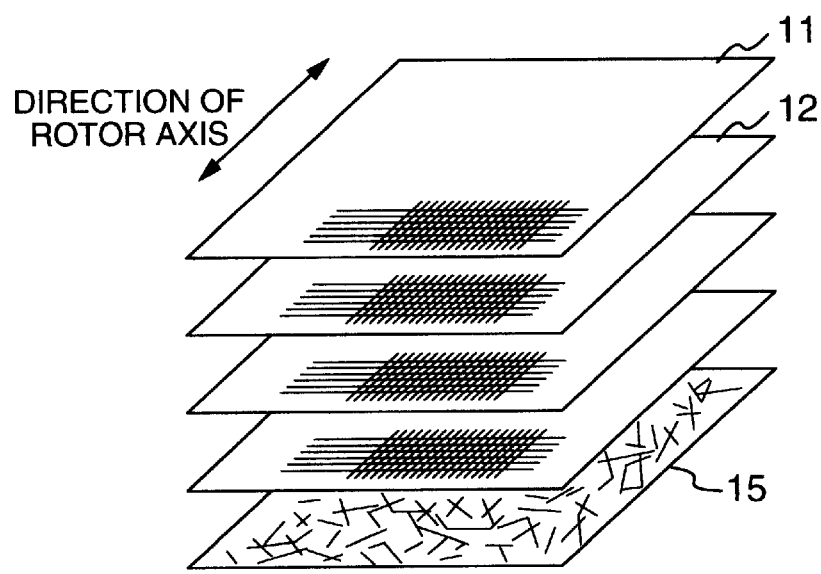
FIG. 8 is a perspective view showing reinforced fiber layers in a creepage block as a further embodiment.

FIG. 8 is a perspective view of reinforced fiber layers that form the creepage block as a further embodiment of the invention.

In FIG. 8, the creepage block 11 comprises a combination of a plurality of prepreg sheets 12 and organic fibers 15 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat.

The organic fibers 15 are cut short to about 1 mm to 10 mm and formed into a fabric, which is impregnated with the same epoxy resin together with the prepreg sheets 12 containing glass fibers.

The organic fibers 15 may be made from polybenzoimidazole, polyparaphenylenebenzobisoxazole, aromatic polyamide, polyarylate, and aromatic polyester. These fibers have a heat resistance of 300° C. or higher so that when the field winding 4 is energized and its temperature rise causes the field winding to expand in the direction of the axis of the rotor 1, these fibers are not destroyed by the frictional heat and maintain a stable frictional state.

According to this embodiment, the organic fibers of the creepage block 11 on the side that is in contact with the field winding 4 stabilize the friction coefficient between the creepage block 11 and the field winding 4, so that when the field winding 4 is energized and its temperature rise causes the field winding to expand in the direction of the axis of the rotor 1, the field winding 4 can slide smoothly along the surface of the creepage block 11 even under high surface pressure. This in turn reduces frictional coefficient variations among the coil slots.

Therefore a rotor can be provided in which the field winding has small frictions and in which there are small friction coefficient variations even when the field winding undergoes repetitive thermal expansions. Further, since the organic fibers are cut short, the organic fiber layer can be formed without having to consider the alignment of the fiber layer. This in turn reduces the manufacturing cost.

Figure 9:
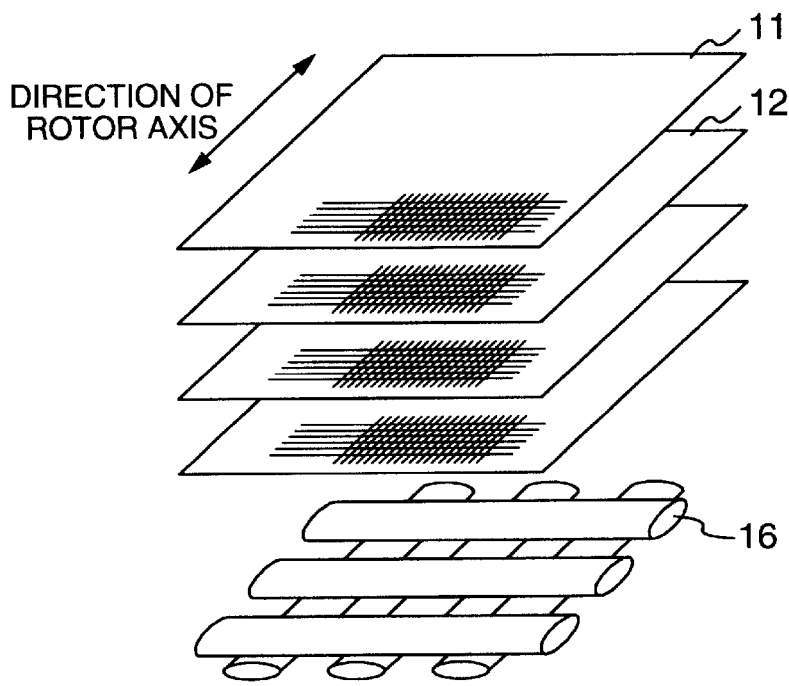
FIG. 9 is a perspective view showing reinforced fiber layers in a creepage block as a further embodiment.

FIG. 9 is a perspective view of reinforced fiber layers that form the creepage block as a further embodiment of the invention.

In FIG. 9, the creepage block 11 is a combination of a plurality of prepreg sheets 12 and organic fibers 16 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat. On the side for contact with the field winding 4 a plurality of bundles of two or more organic fibers 16 are provided. The fabric of organic fibers 16 may be formed by simply stacking together fiber bundles extending in the direction of the rotor axis and those extending in a direction perpendicular to the rotor axis or by weaving them together.

The organic fiber bundles 16 and the glass fiber layers 12 are impregnated with the same epoxy resin. The organic fibers 16 may be made from polybenzoimidazole, polyparaphenylenebenzobisoxazole, aromatic polyamide, polyarylate, and aromatic polyester. These fibers have a heat resistance of 300° C. or higher so that when the field winding 4 is energized and its temperature rise causes the field winding to expand in the direction of the axis of the rotor 1, these fibers are not destroyed by the frictional heat and maintain a stable frictional state.

According to this embodiment, the organic fibers of the creepage block 11 on the side contacting with the field winding 4 stabilize the friction coefficient between the creepage block 11 and the field winding 4, so that when the field winding 4 is energized and its temperature rise causes the field winding to expand in the direction of the axis of the rotor 1, the field winding 4 can slide smoothly along the surface of the creepage block 11 even under high surface pressure. This in turn reduces frictional coefficient variations among the coil slots.

Therefore, a rotor can be provided in which the field winding has small frictions and in which there are small friction coefficient variations even when the field winding undergoes repetitive thermal expansions. Further, since the organic fibers are bundled, there is an advantage that the organic fibers are not easily broken due to friction with the field winding. Because fibers are also arranged in the direction perpendicular to the rotor axis, the fibers arranged in the axial direction are not easily split from one another when subjected to high surface pressure caused by a centrifugal force. It is therefore possible to provide a creepage block highly reliable also in terms of strength.

Figure 10:
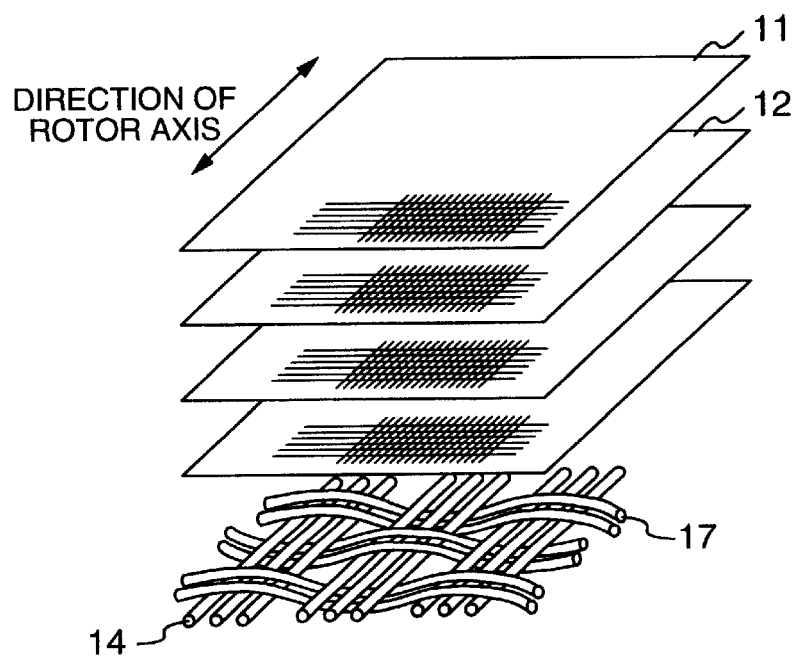
FIG. 10 is a perspective view showing reinforced fiber layers in a creepage block as a further embodiment.

FIG. 10 is a perspective view of reinforced fiber layers that form the creepage block as a further embodiment of the invention.

In FIG. 10, the creepage block 11 is comprises combination of a plurality of prepreg sheets 12 and organic fibers 14, 17 attached to that side of the prepreg sheets which is for contact with the field winding. Each prepreg sheet is made from cloth of perpendicularly woven glass fibers impregnated with semi-hardened epoxy resin, and the thus formed prepreg sheets 12 are piled one upon another and pressed together by press plates under pressure and heat. In the fiber layer closest to the surface for contact with the field winding 4, a plurality of kinds of organic fibers are mixedly provided. First organic fibers 14 are made from polybenzoimidazole, polyparaphenylenebenzobisoxazole, aromatic polyamide, polyarylate, and aromatic polyester. Second organic fibers 17 are made from polyethylene, polypropylene and nylon.

According to this embodiment, the first organic fibers of the creepage block 11 on the side for contact with the field winding 4 ensures a sliding relative to the field winding 4 with small variations in frictional force, when the field winding 4 is energized, has a temperature rise and is expanding thermally. This allows the field winding 4 to slide smoothly along the surface of the creepage block 11 even when subjected to high surface pressure, thus reducing friction coefficient variations among the coil slots. Therefore, a rotor can be provided in which the field winding has small frictions and in which there are small friction coefficient variations even when the field winding undergoes repetitive thermal expansions.

Further, by mixing the second organic fibers, which are inexpensive to manufacture, with the first organic fibers, which are relatively costly to manufacture, it is possible to arrange the first organic fibers over a wide range of the surface of the creepage block 11. As a result a low-cost creepage block can be provided.

Figure 11:
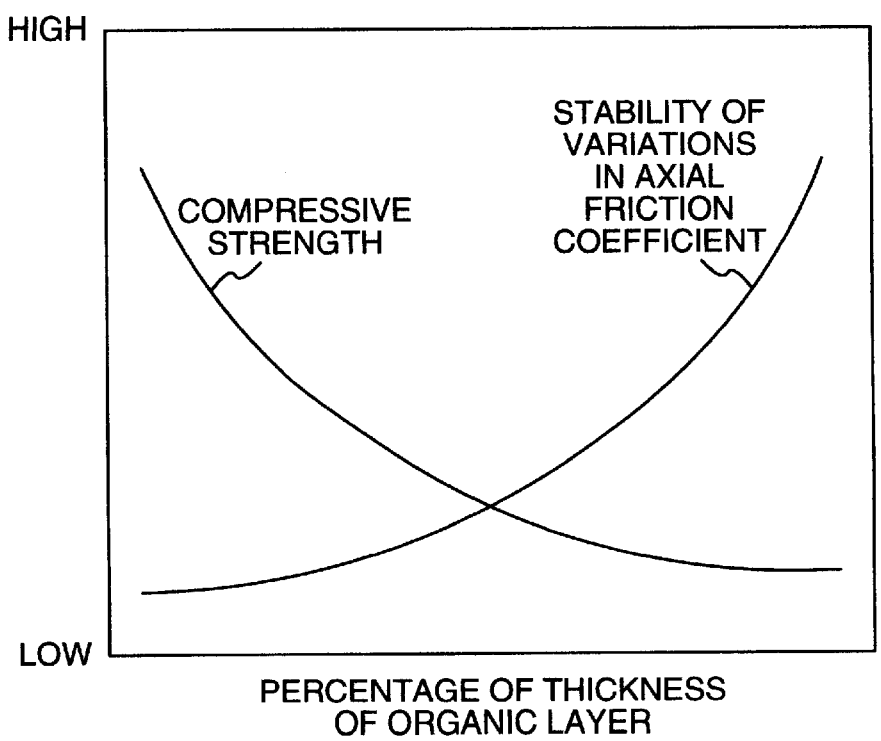
FIG. 11 is a graph showing a relation among a percentage of an organic fiber layer thickness in a creepage block, a compressive strength of the creepage block, and a friction coefficient stability.

FIG. 11 is a graph showing a relation between a percentage by thickness of an organic fiber layer, which is closest to the surface for contact with the field winding 4 among the reinforced fiber layers forming the creepage block 11, and the reinforced fiber layer forming the creepage block 11, and a compressive strength of the creepage block 11, and a relation between the above percentage and a stability of variations in the axial friction coefficient.

The organic fibers are smaller in strength than the glass fibers. When the percentage of the organic fiber layer relative to the thickness of the creepage block 11 is increased, the compressive strength decreases, as shown in FIG. 11. Because the rotor 1 is subjected to a high centrifugal force during rotation, an average surface pressure reaches as high as 50 Mpa. To keep the compressive strength of the creepage block from decreasing, the organic fiber layer needs to be made as thin as possible.

On the other hand, making the organic fiber layer too thin, however, exposes the organic fibers and the glass fibers from the surface of the creepage block which is in contact with the field winding, with the result that the glass fibers gall the field winding. This increases the friction coefficient during the repetitive use, leading to increased variations in the friction coefficient.

In this embodiment, the thickness of the organic fiber layer is set, at the maximum, equal to or less than one fourth the thickness of the creepage block 11. The field winding 4 in an energized state can slide smoothly on the surface of the creepage block 11 for a long period of time without causing a reduction in the strength of the creepage block. As a result, the friction coefficient stabilizes and does not vary among the coil slots 5. When the fiber orientation of the creepage block 11 is determined, the thickness of the organic fiber layer is determined based on the above setting. In this way it is possible to provide a rotor for a rotary electric machine which has a minimal shaft bending.

Figure 12:
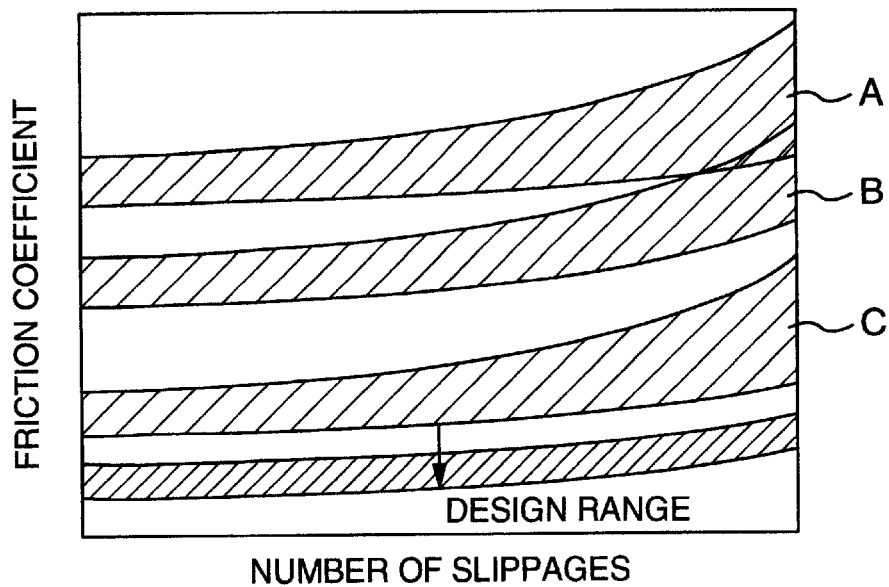
FIG. 12 is a graph showing a relation between a friction coefficient and the number of slippages for members assembled into the rotor.

FIG. 12 is a graph showing a relation between a friction coefficient between the field winding 4 and the creepage block 11 or its variations and the number of times that the field winding 4 slips when the organic fibers are provided in the fiber layer closest to that surface of the creepage block 11 which is in contact with the field winding 4.

FIG. 12 also shows a relation between the friction coefficient and the number of slippages for the wedge 8, the creepage block 11, the field winding 4 and the interlayer insulating material 10 installed in the rotor 1.

In FIG. 12, the range of friction coefficient between the field winding 4 and the creepage block 11 is set smaller than a range A of friction coefficient between the wedge 8 and the rotor 1, a range B of friction coefficient between the creepage block 11 and the wedge 8, and a range C of friction coefficient between the field winding 4 and the interlayer insulating material 10. As the number of slippages increases, the friction coefficient and its variations increase.

As shown in FIG. 12, increasing the thickness of the organic fiber layer can reduce the friction coefficient variations. Thus, within the designed number of slippages, setting the friction coefficient between the field winding 4 and the creepage block 11 smaller than any friction coefficients in the ranges A, B, C keeps the slippages always occurring between the field winding and the creepage block.

According to this embodiment, the thermal expansion of the field winding 4 at the time when it is energized can be absorbed by a slippage between the creepage block 11 and the radially outermost turn of the field winding 4 in the rotor 1, and thus the slippage occurs at the same position in all coil slots 5. As a result, the radii of all bending moments acting on the shaft of the rotor 1 are equal. It is therefore possible to provide a rotor for a rotary electric machine in which the shaft bending will not occur easily.

Figure 13:
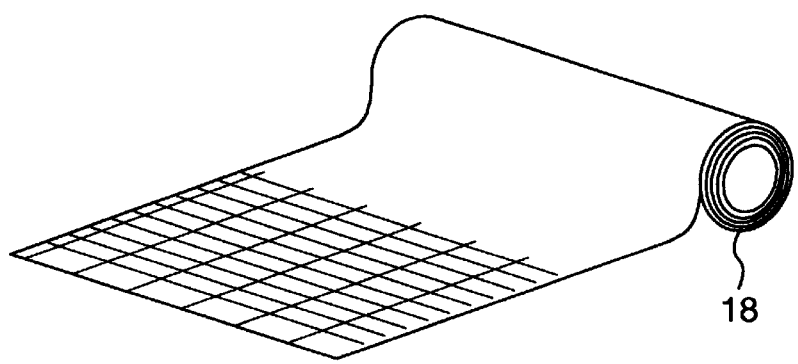
FIG. 13 is a perspective view of a prepreg sheet roll.

FIG. 13 is a perspective view for explanation of a state in which prepreg sheets as a base material of the creepage block are rolled.

In FIG. 13, reference numeral 18 denotes a rolled portion in which a plurality of prepreg sheets, each made from a cloth of perpendicularly woven glass fibers impregnated with semi-hardened epoxy resin, are piled one upon another and pressed together by press plates under pressure and heat.

Figure 14:
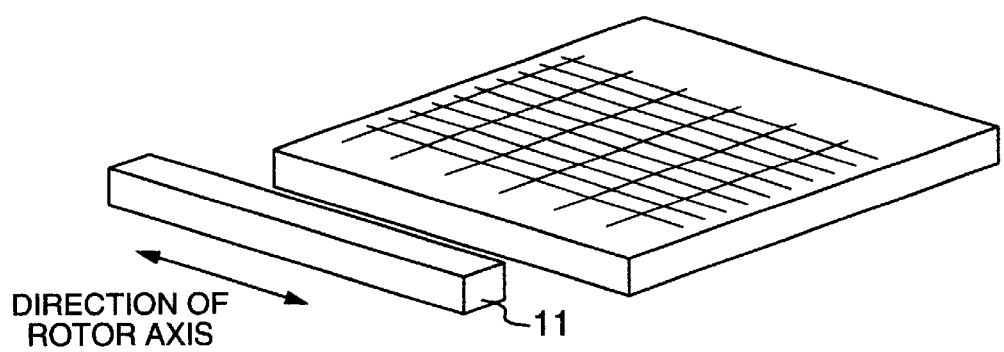
FIG. 14 is a perspective view of the creepage block cut from laminated prepreg sheets.

FIG. 14 is a perspective view of the creepage block formed by laminating a plurality of the prepreg sheets under pressure and heat into a plate and by cutting it into a block. In FIG. 14, the creepage block 11 is formed by cutting the prepreg sheets of FIG. 13.

Figure 15:
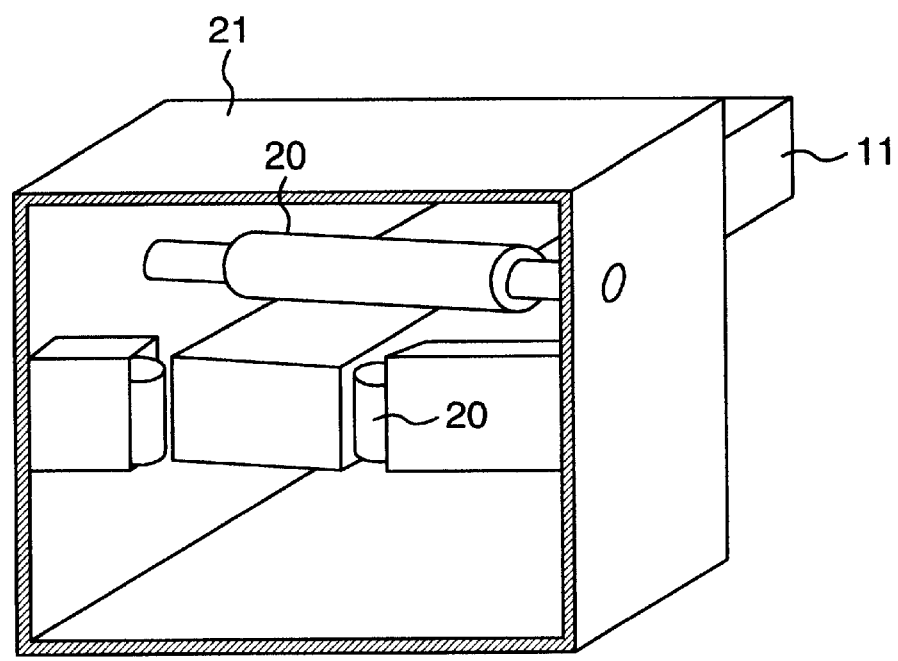
FIG. 15 is a perspective view of a creepage block processing apparatus.

FIG. 15 is a perspective view of a processing apparatus for final finishing of creepage blocks.

In FIG. 15, reference number 20 denotes a cutter for cutting to designed dimensions an integrally molded member, which is formed by laminating prepreg sheets made of glass fibers and epoxy resin and integrally molding a fiber layer containing organic fibers on one side of the laminated prepreg sheets. Designated 21 is a case accommodating this processing apparatus. The organic fiber layer may be made from long fibers or short fibers.

According to this embodiment, the creepage block 11 can be machined to precise dimensions. Further, since the organic fibers are exposed at the surface of the creepage block which is in contact with the field winding, there is brought forth an advantage that the epoxy resin, which serves as a detrimental factor to stabilizing the friction coefficient, is removed from the contact surface. This further stabilizes the friction coefficient.

Figure 16:
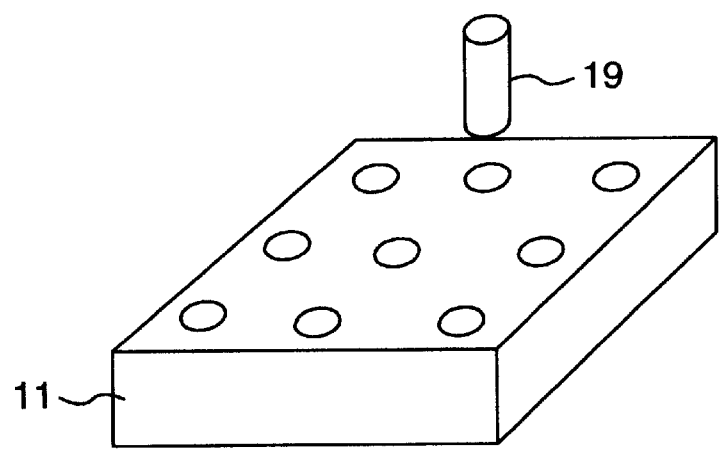
FIG. 16 is a perspective view of a creepage block.
Figure 17:
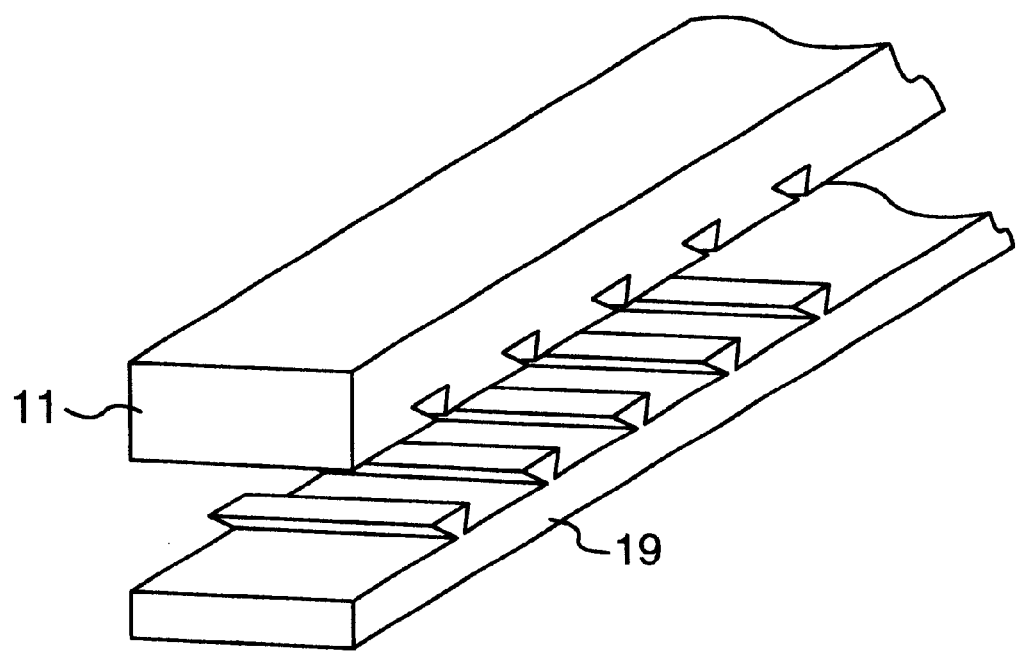
FIG. 17 is a perspective view of another creepage block.

FIG. 16 and FIG. 17 are perspective views of creepage blocks 11.

In FIG. 16, the creepage block 11 is made of epoxy resin reinforced by glass fibers. Because there is a layer of glass fibers and epoxy resin also in the surface of the creepage block for contact with the field winding, the friction coefficient tends to vary as the number of slippages increases, as is the case with the conventional construction. The creepage block 11 is formed with a plurality of holes extending in the direction of plate thickness, in which are fixed resin members 19 containing organic fibers. The resin members containing organic fibers may be shaped like a pin.

FIG. 17 is a perspective view of the creepage block 11.

As shown in FIG. 17, the resin member 19 containing organic fibers may be shaped like a plate. In this case, the organic fibers are short fibers formed from polybenzoimidazole, polyparaphenylene benzobisoxazole, aromatic polyamide, polyarylate, or aromatic polyester.

According to this embodiment, it is possible to secure a member containing an organic fiber layer with a stable friction coefficient also to a creepage block of the conventional construction. Since the organic fibers in the surface of the creepage block 11 which is in contact with the field winding 4 stabilize the friction coefficient between the creepage block 11 and the field winding 4, the field winding 4 can slide smoothly along the surface of the creepage block 11 even under high surface pressure, thus reducing the friction coefficient variations among the coil slots.

It is therefore possible to provide a rotor in which the field winding has small frictions and in which there are small friction coefficient variations even when the field winding undergoes repetitive thermal expansions.

As described above, the organic fibers in the present invention have a heat resistance of 300° C. or higher, so that when the field winding is energized and its temperature rise causes the field winding to expand in the direction of rotor axis, these organic fibers are not destroyed by the frictional heat and maintain a stable frictional state. Therefore, the field winding has small frictions and the variations in the friction coefficient are small even when the field winding undergoes repetitive thermal expansions. This minimizes the amount of copper particles produced from the field winding.

The present invention can provide a rotary electric machine which has only small shaft oscillations caused by the bending of the rotor shaft during rotation.

It will be further understood by those skilled in the art that the foregoing description has been made on the embodiments of the invention and that various changes and modifications may be made in the invention without departing from the spirit of the invention and the scope of the appended claims.

What is claimed is:

1. A rotary electric machine comprising:
   a stator frame;
   a rotor mounted on the stator frame through bearings, said rotor having a plurality of slots formed in an outer circumferential surface thereof;

a field winding installed in the slots; and creepage blocks for electric insulation supported in openings of the rotor in contact with the field winding, each of said creepage blocks being formed by pressing together a resin member containing reinforcement fibers and organic fibers for contact with the field winding.

2. A rotary electric machine comprising:

a stator frame;

a rotor mounted on the stator frame through bearings, said rotor having a plurality of slots formed in an outer circumferential surface thereof;

a field winding installed in the slots; and creepage blocks for electric insulation supported in openings of the rotor in contact with the field winding, each of said creepage blocks comprising prepreg sheets and organic fibers for contact with the field winding, said prepreg sheets having reinforcement fibers which are aligned in a direction, impregnated with semi-hardened resin and fixed together, said organic fibers for contact with the field winding being aligned in a direction of axis of the rotor.

3. A machine according to claim 2, wherein each of said creepage blocks comprises prepreg sheets and organic fibers for contact with the field winding, said prepreg sheets having reinforcement fibers, which are aligned in a direction, impregnated with semi-hardened resin and fixed together, and said organic fibers are short and directed in random directions.

4. A machine according to claim 2, wherein said organic fibers for contact with the field winding include fibers made from polybenzoimidazole, polyparaphenylene-benzobisoxazole, aromatic polyamide, polyarylate, and aromatic polyester.

5. A machine according to claim 2, wherein said organic fibers for contact with the field winding include fibers with a heat resistance of 300° C. or higher.

6. A machine according to claim 4, wherein a surface of said organic fibers for contact with the field winding is combined with fibers made from polyethylene, polypropylene and nylon.

7. A machine according to claim 4, wherein the surface of said organic fibers for contact with the field winding is machined so that the organic fibers are exposed at the surface.

8. A machine according to claim 4, wherein the surface of said organic fibers for contact with the field winding has a thickness equal to or less than one fourth the thickness of the creepage block.

9. A machine according to claim 8, wherein each of said creepage blocks is formed with holes extending in a direction of a thickness of the block and members containing organic fibers are inserted in the holes.

10. A machine according to claim 1, wherein each of said creepage blocks is supported in a respective slot of said rotor with the organic fibers being provided at a surface thereof for contacting the field winding.

11. A machine according to claim 2, wherein each of said creepage blocks is supported in a respective slot of said rotor with the organic fibers being provided at a surface thereof for contacting the field winding.

* * * * *